UNITED STATES PATENT OFFICE.

C. THEODOR BURCHARDT, OF BROOKLYN, NEW YORK.

IMPROVED MODE OF INLAYING AND ORNAMENTING ARTICLES OF RUBBER.

Specification forming part of Letters Patent No. 43,666, dated August 2, 1864.

*To all whom it may concern:*

Be it known that I, CARL THEODOR BURCHARDT, of Brooklyn, in the county of Kings and State of New York, have invented a new and useful Improvement in the Manufacture of India-Rubber; and I do hereby declare that the following is a full, clear, and exact description of the same.

The object of this invention is to give to articles made of hard rubber a variegated or ornamental appearance; and the invention consists in applying to the rubber, before it is subjected to the vulcanizing or curing process, chips, filings, or dust of gold, silver, or any other metal, according to certain patterns or designs, so as to produce on the surface of the india-rubber articles similar designs formed by the metal dust.

To enable those skilled in the art to make and use my invention, I will proceed to describe it.

In order to apply to the surface of the india-rubber any desired characters or figures, certain designs may be produced on the surface of the articles by the use of metal dust or filings. In order to accomplish this object the design to be produced is marked or carved out in the mold, and the metal dust or filings are placed in those parts of the mold which are to produce the ornamental designs on the surface of the india-rubber article. The india-rubber is then introduced and cured in the usual manner. During the curing process the metal-dust incorporates itself with the india-rubber and sticks to it perfectly firm, and in this manner any desired design may be produced on the rubber, either yellow, white, or in different colors, according to the nature of the metal filings used in the process.

I am aware that rubber articles have before been ornamented by using chips or filings of metal through the mass of rubber while in a plastic state, and also by applying metallic plates to face of the same. This, therefore, I do not claim.

What I claim as new, and desire to secure by Letters Patent, is—

The process hereinbefore described of ornamenting the surface of india-rubber by applying metal dust or filings in the required forms within the molds in which the rubber is formed before vulcanizing, in the manner and for the purposes specified.

CARL THEODOR BURCHARDT.

Witnesses:
  M. M. LIVINGSTON,
  GEO. W. REED.